United States Patent

Beecken

[11] 4,077,962
[45] Mar. 7, 1978

[54] STYRYL DYESTUFFS

[75] Inventor: Hermann Beecken, Leverkusen, Germany

[73] Assignee: Bayer Aktiengesellschaft, Leverkusen-Bayerwerk, Germany

[21] Appl. No.: 616,263

[22] Filed: Sep. 24, 1975

[30] Foreign Application Priority Data

Oct. 1, 1974 Germany .................... 2446759

[51] Int. Cl.² ............... C07D 215/12; C07D 215/14; C07D 215/18; C07D 215/2
[52] U.S. Cl. ................. 260/383 CN; 8/4; 8/6; 8/21 C; 8/41 R; 8/163; 8/165; 8/166; 260/287 T; 260/289 R; 260/326.11 R; 542/422; 544/10.5
[58] Field of Search ............ 260/283 CN, 287 T

[56] References Cited

U.S. PATENT DOCUMENTS

| 3,240,783 | 3/1966 | Straley et al. | 260/283 CN |
|---|---|---|---|
| 3,247,211 | 4/1966 | Weaver et al. | 260/283 CN |
| 3,453,280 | 7/1969 | Weaver et al. | 260/283 CN |
| 3,595,863 | 7/1971 | Coates et al. | 260/283 CN |
| 3,917,604 | 11/1975 | Hoyle | 260/283 CN |
| 4,006,178 | 2/1977 | Stagi et al. | 260/287 T |
| 4,016,191 | 4/1977 | Beecken | 260/283 CN |

Primary Examiner—Donald G. Daus
Assistant Examiner—Mary Vaughn
Attorney, Agent, or Firm—Plumley and Tyner

[57] ABSTRACT

The invention relates to water-insoluble styryl dyestuffs of the formula

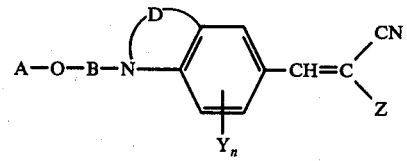

in which
A is aryl
B is an alkylene bridge,
D denotes the remaining members of a heterocycle
Y denotes a non-ionic substituent,
n is 0, 1, 2 or 3 and
Z denotes a cyano group or a carboxylic acid ester group.

The dyestuffs are outstanding suitable for the dyeing of synthetic fibre materials which are dyed in greenish-yellow shades with good fastness properties, especially good resistance to hydrolysis.

8 Claims, No Drawings om # STYRYL DYESTUFFS

The present invention relates to practically water-insoluble styryl dyestuffs of the formula $$A-O-B-N\underset{Y_n}{\overset{D}{\diagdown}}\underset{}{\bigcirc}-CH=C\underset{Z}{\overset{CN}{\diagdown}} \quad (I)$$

wherein
- A denotes an aryl radical,
- B denotes an alkylene bridge,
- D denotes the remaining members of a partially saturated 5-membered to 7-membered heterocyclic structure,
- Y denotes a non-ionic substituent, especially alkyl, alkoxy, phenoxy, trifluoromethyl or halogen,
- n denotes the numbers 0 to 3 and
- Z denotes a cyano grouping or carboxylic acid ester grouping $CO_2R$, wherein
- R represents an alkyl, alkenyl, cycloalkyl or aralkyl radical, and wherein
the alkyl, alkenyl, cycloalkyl, aryl, phenoxy, alkylene and alkoxy groups and remaining members D of the heterocyclic structure can contain further non-ionic substituents, and to their preparation, and use for dyeing and printing of synthetic fibre materials and for bulk dyeing of thermoplastics.

"Non-ionic substituents" in the sense of the invention are substituents which are customary in styryl dyestuff chemistry and do not confer solubility in water in a neutral to acid pH range, such as, for example, $C_1$- to $C_{12}$-alkyl; $C_1$- to $C_{12}$-alkoxy; $C_5$- to $C_8$-cycloalkyl optionally with 1 to 5 $C_1$-$C_4$-alkyl substituents and/or bonded to $C_1$-$C_4$-alkyl; $C_3$- to $C_{12}$-alkenyl; $C_3$- to $C_{12}$-alkenyloxy; $C_5$- to $C_8$-cycloalkoxy; $C_1$- to $C_{12}$-alkylmercapto; $C_3$- to $C_{12}$-alkenylmercapto; $C_5$- to $C_8$-cycloalkylmercapto; phenyl; phenoxy; phenylmercapto; phenyl-$C_1$-$C_4$-alkyl; phenoxy-$C_1$-$C_4$-alkyl; phenylmercapto-$C_1$-$C_4$-alkyl; halogen; $C_1$-$C_4$-alkoxycarbonyl, $C_1$-$C_4$-alkylcarbonyl, benzoyl or cyano, it being possible for the phenyl or phenoxy radicals, mentioned in any context above, to be monosubstituted, disubstituted or trisubstituted by $C_1$-$C_4$-alkyl, $C_1$-$C_4$-alkoxy, phenyl, phenoxy, halogen or phenylmercapto. Amongst the alkyl and alkoxy radicals mentioned above in any context, those with 1 to 4 C atoms are preferred; methyl, ethyl, methoxy and ethoxy are very particularly preferred. "Halogen" is to be understood above all as Cl, in addition to F and Br.

Suitable aryl radicals A are phenyl, naphthyl, dibenzofuranyl and dibenzothiophenyl radicals with optionally up to five non-ionic substituents; amongst these radicals, substituted phenyl radicals as defined in more detail above are particularly preferred.

Suitable alkylene bridges B in the sense of the invention are $C_2$- to $C_5$-alkylene chains which can also be branched and/or substituted by a $C_1$- to $C_4$-alkoxy or $C_3$- to $C_5$-alkenyloxy group, or by a benzyloxy, phenoxy or phenyl group optionally containing 1 – 3 non-ionic substituents, such as, for example, methyl, ethyl, bromine or chlorine.

Preferred cycloalkyl radicals are cyclopentyl, methylcyclopentyl, cyclohexyl, methylcyclohexyl, bicyclo[2,2,1]hept-2-yl, bicyclo[2,2,2]oct-2-yl and cyclooctyl.

Particularly suitable aralkyl radicals are benzyl, phenethyl and phenpropyl groups optionally having 1 – 3 non-ionic substituents, such as, preferably, methyl, ethyl, bromine or chlorine.

Preferred substituents Y in the aromatic nucleus of the chromophore, which may be present independently of one another, are in particular methyl, ethyl, methoxy, ethoxy, phenoxy and chlorine.

Preferred chains D contain 2 to 4 carbon atoms in an unbranched arrangement, of which atoms one can be replaced by a hetero-atom, such as nitrogen, sulphur and especially oxygen, and the hydrogen atoms can be substituted by lower alkyl or halogen, preferably by methyl, ethyl or chlorine. Preferably, Z represents cyano.

A group of preferred dyestuffs in the sense of the invention are those of the formula $$\begin{array}{c} U_3 \diagdown \diagup U_4 \\ U_2 \diagdown C \\ | \\ C \\ U_1 \diagup \diagdown N \\ | \\ A-O-B' \end{array} \underset{Y'}{\bigcirc} -CH=C\underset{Z}{\overset{CN}{\diagdown}} \quad (II)$$

wherein
- A and Z have the meanings mentioned under formula I,
- B' represents the bridges $$-CH_2-CH_2-, \; -\underset{CH_3}{\overset{|}{CH}}-CH_2-, \; -\underset{C_6H_5}{\overset{|}{CH}}-CH_2-,$$

$$-(CH_2)_3-, \; -(CH_2)_4-, \; -\underset{CH_2-OCH_3}{\overset{|}{CH}}-CH_2-,$$

$$-\underset{CH_2-OC_6H_5}{\overset{|}{CH}}-CH_2- \; \text{or} \; -\underset{CH_2-OC_2H_5}{\overset{|}{CH}}-CH_2-$$

- Y' represents hydrogen, methyl, methoxy, ethyl, ethoxy or chlorine, whilst
- $U_1$ denotes methyl or ethyl,
- $U_2$ denotes hydrogen and
- $U_3$ and $U_4$ denote hydrogen, methyl, ethyl or, conjointly, the remaining members of a cyclopentyl or cyclohexyl ring or
- $U_2$ and $U_3$ conjointly denote the remaining members of a cyclopentyl or cyclohexyl ring.

A further group of preferred dyestuffs according to the invention corresponds to the formula (III)

[structure III]

wherein
A, B', Y' and Z have the abovementioned meanings and
$V_1$, $V_2$ and $V_4$ independently of one another represent hydrogen, methyl, ethyl, propyl or butyl and
$V_3$ represents hydrogen or chlorine.

Further preferred dyestuffs are those corresponding to the formula (IV)

[structure IV]

wherein
A, B', Y' and Z have the abovementioned meanings and
$W_1$, $W_2$, $W_3$ and $W_4$ independently of one another represent hydrogen or $C_1$–$C_4$-alkyl, preferably methyl or ethyl.

Dyestuffs to be singled out particularly, because of their good tinctorial properties, are those of the formula (V)

[structure V]

wherein
A, $V_1$, $V_2$, $V_3$ and $V_4$ have the meanings already mentioned,
B'' represents —$CH_2$—$CH_2$—, $$-CH-CH_2- \text{ or } -CH-CH_2-$$
$$\;\;\;|\qquad\qquad\qquad |$$
$$\;\;CH_3\qquad\qquad\;\; C_6H_5$$

and
Y'' represents H or $CH_3$,
as well as the dyestuffs of the formula (VI)

[structure VI]

wherein
A, B'', $W_1$, $W_2$, $W_3$, $W_4$ and Y'' have the abovementioned meanings.

Particularly valuble dyestuffs according to the present invention possess the formula (VII)

[structure VII]

wherein
A has the meanings defined under formula I.

Amongst the abovementioned dyestuffs of the formulae II to VII, preferred dyestuffs are, in turn, those wherein
A represents a phenyl radical which can have 1 to 5 chlorine or methyl substitutents or can be substituted by a bromine atom or a cyclohexyl, phenyl, benzyl, α,α-dimethylbenzyl, methoxy, ethoxy, phenoxy, benzyloxy, tert.-butyl, methylmercapto, phenylmercapto, chlorophenoxy or methylphenoxy radical.

The new dyestuffs according to the invention are prepared in a manner which is in itself known, by reacting aldehydes of the formula (VIII)

[structure VIII]

or their functional derivatives, for example those of the formula (VIIIa)

[structure VIIIa]

wherein
A, B, D, Y and n have the meanings mentioned under formula I and
E represents N-$R_1$ (aldimines) or

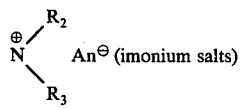 (imonium salts)

wherein
$R_1$ preferably denotes a phenyl, sulphophenyl or carboxyphenyl radical,
$R_2$ and $R_3$ both represent $C_1$-$C_4$-alkyl and
$R_3$ can also represent phenyl and
An⁻ represents an acid anion
with methylene-active compounds of the formula

 (IX)

wherein
Z can have the meaning indicated under formula I.

The reactions are carried out at temperatures between 20° and 160° C, preferably in the temperature range from 50° - 120° C, in the melt or, in most cases, in a solvent which is inert under the reaction conditions. Examples of suitable solvents which may be mentioned are lower aliphatic alcohols with 1 to 4 carbon atoms, especially methanol, ethanol, the propanols and butanols, and also benzene, toluene, xylene, chlorobenzene, dichlorobenzenes, chloroform, dimethylformamide, dimethylsulphoxide and acetonitrile. To accelerate the reaction, it is possible to add the basic catalysts customary for the Knoevenagel reaction, such as, for example, ammonia, diethylamine, triethylamine, piperidine, morpholine, N-ethylpiperidine, N-methylmorpholine, basic ion exchange resins, alkali metal hydroxides, alkali metal alcoholates, alkali metal carbonates, alkali metal acetates, acetates of ammonia and acetates of organic bases, such as, for example, ammonium acetate or piperidine acetate. However, the reaction can also be carried out readily in the presence of acetic acid and even in glacial acetic acid as the solvent.

It is also possible, and advantageous, to dispense with the customary isolation of the aldehydes VIII, which in most cases entails considerable losses, and to use the aldehydes, after decomposing excess Vilsmeier reagent by lower aliphatic alcohols and adjusting the pH value to about 6.5 - 8.5, directly for condensations with the methylene-active components IX. In that case, the presence of an emulsifying additive, for example of oxethylation products of higher alcohols or substituted phenols, can be useful, especially if aqueous alkali or aqueous ammonia is used to adjust the pH.

Suitable methylene-active compounds IX are, for example, malonic acid dinitrile, cyanoacetic acid methyl ester, cyanoacetic acid ethyl ester, cyanoacetic acid propyl ester, cyanoacetic acid butyl ester, cyanoacetic acid cyclohexyl ester, cyanoacetic acid γ-methoxypropyl ester, cyanoacetic acid cyanoethyl ester, cyanoacetic acid β-chloroethyl ester, cyanoacetic acid β-acetoxyethyl ester, cyanoacetic acid benzyl ester, cyanoacetic acid 4-chlorobenzyl ester, cyanoacetic acid 3,4-dichlorobenzyl ester, cyanoacetic acid 2,4,6-trichlorobenzyl ester, cyanoacetic acid β-phenoxyethyl ester, cyanoacetic acid β-(4-chlorophenoxy)-ethyl ester, cyanoacetic acid β-(4-methylphenoxy)-ethyl ester, cyanoacetic acid β-(4-tert.-butylphenoxy)-ethyl ester, cyanoacetic acid γ-phenoxypropyl ester, cyanoacetic acid β-phenylethyl ester, cyanoacetic acid γ-phenylpropyl ester, cyanoacetic acid γ-phenylallyl ester and cyanoacetic acid α-naphthylmethyl ester.

To prepare suitable aldehydes VIII or imonium salts VIII a, the starting materials used are heterocyclic bases of the formula

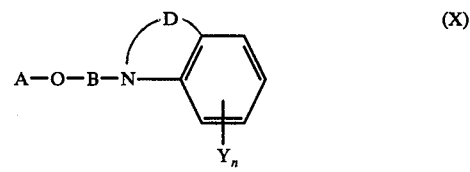 (X)

wherein
the symbols A, B, D, Y and $n$ have the meanings mentioned under formula I.

The bases are reacted in a manner which is in itself known with so-called Vilsmeier reagents, that is to say mixtures of N-formyl compounds

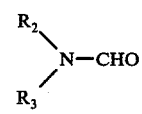

and inorganic acid halides, preferably phosphorus oxychloride, thionyl chloride or phosgene, or are formulated by the method of Duff (Journal of the Chemical Society [London] 1952, pages 1,159 - 1,164), advantageously in the variant of German Patent Specification No. 1,206,879. Suitable aldimines (VIIIa) are obtained, for example, in accordance with the instructions in U.S. Pat. No. 2,583,551 (Example 17).

The bases X can be prepared in several ways which are in themselves known; the following may be mentioned here:

(a) The reaction of compounds of the formula XI, capable of N-alkylation, with partially saturated heterocyclic bases of the formula XII in the presence of customary acid-binding additives, in accordance with the following equation

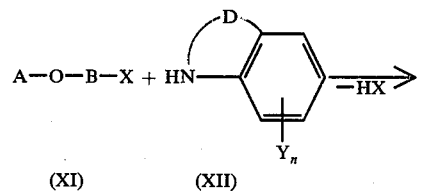

(XI)  (XII)

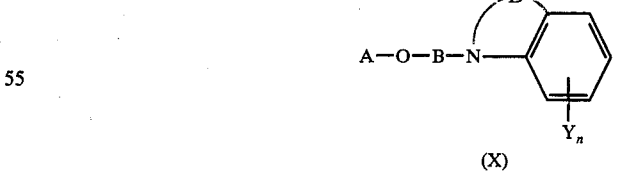

(X)

wherein
A, B, D, Y and $n$ have the meanings indicated under formula I, whilst
X represents, for example, chlorine, bromine, iodine, $CH_3SO_3$, $C_6H_5SO_3$ or $CH_3$—$C_6H_4SO_3$, but preferably denotes chlorine or bromine,
it being possible to add catalytic amounts of sodium iodide or potassium iodide to facilitate the reaction between XI and XII. (Compare German Auslegeschrift (German Published Specification No. 2,010,491, Example 2).

(b) Reaction of phenolates of the formula XIII with tertiary bases, capable of O-alkylation, of the formula XIV, in accordance with the following equation:

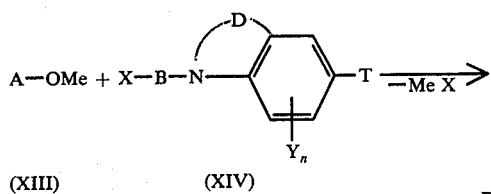

(XIII)  (XIV)

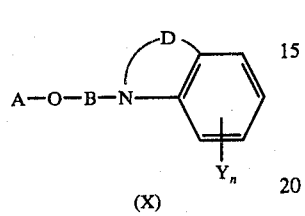

(X)

in which
A, B, D, Y, $n$ and X have the meanings indicated under (a),
T represents hydrogen and
Me represents one equivalent of an alkali metal ion, alkaline earth metal ion or heavy metal ion.

Examples which may be mentioned are the ions of lithium, sodium, potassium, magnesium, calcium, lead, copper or silver, preferably of sodium and potassium. The phenolates XIII can suitably also be produced in the reaction medium itself, from the corresponding phenols, if appropriate in the presence of the compounds XIV, by adding at least one equivalent of a suitable metal compound, such as, for example, of the oxide, hydroxide, bicarbonate, carbonate or the like.

(c) By thermal elimination of carbon dioxide from mixed carbonic acid esters of the formula

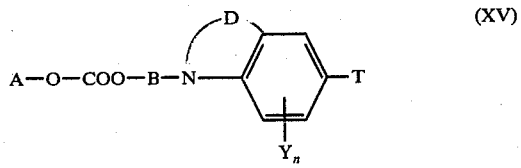

(XV)

wherein
A, B, D, Y, $n$ and T have the aforementioned meanings.

The preparation and thermal decomposition of the compounds XV is carried out in a manner which is in itself known, by reacting chloroformic acid esters of the formula XVI with hydroxyalkyl compounds of the formula XVII in inert solvents and in the presence of suitable acid-binding additives, such as, for example, alkali metal carbonates or pyridine bases, in accordance with the equation

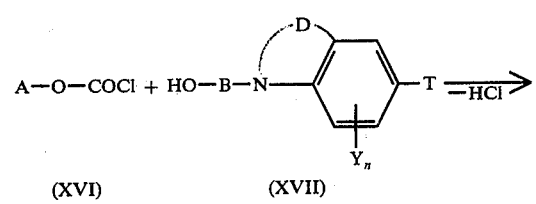

(XVI)  (XVII)

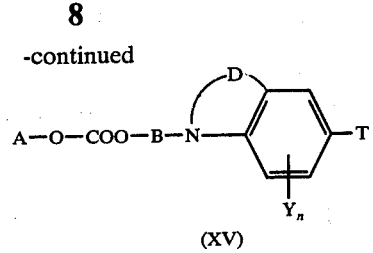

(XV)

or reacting phenolates XIII with chloroformic acid esters XVIII in accordance with the equation

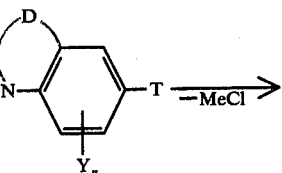

(XIII)  (XVIII)

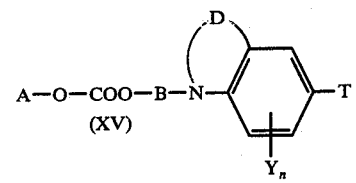

(XV)

and heating the esters XV to temperatures above about 100° C.

The reactions according to (b) and (c) can advantageously also be carried out with compounds XIV and XV, in which
T denotes, in place of hydrogen, a formyl group (T=CHO) or the $$-CH=C\begin{array}{c}CN\\ \\Z\end{array}$$

group and
Z has the meanings indicated under formula I,
so that the aldehydes of the formula VIII or the corresponding styryl dyestuffs I are obtained directly.

The following may be mentioned as suitable partially saturated heterocyclic bases XII from which it is possible to obtain in a known manner, by oxalkylation, for example by means of ethylene carbonate, ethylene oxide or propylene oxide, or by reaction with halogenoalkanols, for example β-halogenoethanols, halogenopropanols and halogenobutanols, the compounds XVII (T=H) which can be converted, with the aid of acid halides, such as phosphorus oxychloride, phosphorus tribromide, methanesulphonyl chloride, benzenesulphonyl chloride and toluenesulphonyl chloride, to the intermediate products XIV (T=H), or from which bases it is possible directly to obtain the intermediate products XIV (T=CHO) by Vilsmeier formylation, or smoothly to obtain the chloroformic acid esters XVIII by means of phosgene: 2-methyl-, 2-ethyl-, 2-methyl-6-chloro-, 2,5-dimethyl-, 2,3,3-trimethyl-, 2,3,3,6-tetramethyl-, 2,3,3-trimethyl-6-chloro-, 2,3,3-trimethyl-6-methoxy and 2,3,3,7-tetramethyl-2,3-dihydroindole, 2-methyl-, 2,7-dimethyl-, 2,2,4-trimethyl-, 2-methyl-7-methoxy-, 2-methyl-7-chloro-, 2-methyl-7-bromo-, 2-methyl-7-acetamino-, 2-methyl-7-phenyl-, 2,2,4-trimethyl-7-methoxy-, 2,2,4-trimethyl-7-bromo-, 2-methyl-7- acetamino-, 2-methyl-7-phenyl-, 2,2,4-trimethyl-7-methoxy-, 2,2,4-trimethyl-7-bromo-, 2,2,4-trimethyl-7-chloro-, 2,2,4-trimethyl-7-trifluoromethyl-, 2-ethyl-7-methyl-, 2-n-butyl-7-methyl and 2-i-propyl-7-methyl-1,2,3,4-tetrahydro-quinoline, 3,6-dimethyl-, 2,3-dimethyl-, 2,3,6-trimethyl-, 2,2,3-trimethyl-, 2,2,3,6-tetramethyl-, 2,2,3-trimethyl-6-methoxy-, 2,2,3-trimethyl-6-chloro-, 2,2,3-trimethyl-6-acetamino- and 3-ethyl-6-methyl-2,3-dihydro-benzoxazine-(1,4) and 3,3-tetramethylene-2-methyl-, 3,3-pentamethylene-2-methyl-, 3,3-tetramethylene-2,6-dimethyl-, 3,3-pentamethylene-2,6-dimethyl-, 2,3-trimethylene-6-methyl-, 2,3-tetramethylene- and 2,3-tetramethylene-6-methyl-2,3-dihydroindole.

If the N-hydroxyalkyl derivatives of the abovementioned secondary bases XII are reacted by the Vilsmeier method, for example with dimethylformamide and phosphorus oxychloride, the corresponding N-chloroalkyl-aldehydes XIV are obtained therefrom in a known manner; these are used to prepare the aldehydes VIII, as explained above.

Amongst the multiplicity of aldehydes XIV which can be prepared and are suitable for reaction with phenolates XIII, a few may be mentioned as examples: N-β-chloroethyl-6-formyl-2-methyl-, N-β-chloroethyl-6-formyl-2,7-dimethyl-, N-β-chloroethyl-6-formyl-2,2,4-trimethyl-, N-β-chloroethyl-6-formyl-2-methyl-7-methoxy-, N-β-chloroethyl-6-formyl-2,2,4-trimethyl-7-chloro-, N-β-chloroethyl-6-formyl-2,2,4,7-tetramethyl-, N-β-chloropropyl-6-formyl-2,2,4,7-tetramethyl-, N-γ-chloropropyl-2,2,4-trimethyl-, N-β-chloroethyl-6-formyl-2-ethyl-7-methyl and N-β-chloroethyl-6-formyl-2,2,4-trimethyl-7-trifluoromethyl-1,2,3,4-tetrahydroquinoline, N-β-chloroethyl-7-formyl-3,6-dimethyl-, N-β-chloroethyl-7-formyl-2,3,6-trimethyl, N-β-chloroethyl-7-formyl-3-methyl-6-chloro-, N-γ-chloropropyl-7-formyl-2,3,6-trimethyl- and N-β-chloropropyl-7-formyl-3-ethyl-5-methoxy-2,3-dihydrobenzoxazine-(1,4)- and N-δ-chlorobutyl-5-formyl-2,3,3-trimethyl-, N-γ-chloropropyl-5-formyl-2,3,3-trimethyl-, N-β-chloropropyl-5-formyl-2,3,3-trimethyl- and N-β-chloroethyl-5-formyl-2,3,3-trimethyl-2,3-dihydroindole.

Finally, the dyestuffs according to the invention can also be prepared by first condensing the N-halogenoalkylaldehydes XIV with the methylene-active compounds IX to give the N-halogenoalkyl-styryl dyestuffs XIX and then reacting these, in a manner which is in itself known, with phenolates XIII, in accordance with the following equation:

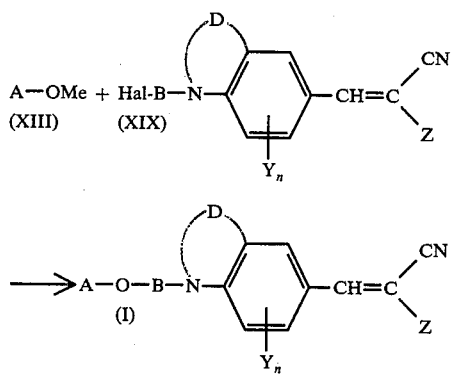

wherein
A, Me, Hal, B, D, Y, n and Z have the abovementioned meaning.

The reaction conditions can be selected analogously to Example 1 of Swiss Patent Specification No. 505,876.

Examples of suitable phenols XIII (Me=H) for the preparation of the phenolates XIII, the intermediate products XI and the chloroformic acid esters XVI are: phenol, the isomeric cresols, the isomeric ethylphenols, the isomeric chlorophenols and bromophenols, the isomeric xylenols, methyl-ethyl-phenols, methyl-chlorophenols, ethyl-chlorophenols and phenylphenols, 4-benzoyl-phenol, α- and β-naphthol, the isomeric hydroxy-dibenzofuranes and hydroxydibenzothiophenes, 4-propylphenol, 4-isopropylphenol, 4-tert.-butylphenol, 2-tert.-butylphenol, 2-t-butyl-p-cresol, 4-ethyl-2-isopropylphenol, 4-n-amylphenol, 2-ethyl-4-isopropylphenol, 2,5-diethylphenol, 4-hydroxy-3,5-di-tert.-butylphenol, 5,6,7,8-tetrahydro-β-naphthol, 1-bromo-5,6,7,8-tetrahydro-β-naphthol, 4-chloro-3,5-diethylphenol, 4-chloro-5,6,7,8-tetrahydro-α-naphthol, 4-tert.-butyl-1-naphthol, 4-(1,1,3,3-tetramethylbutyl)-phenol, 2,4-di-(1,1,3,3-tetramethylbutyl)-phenol, 4-nonylphenol, 4-laurylphenol, 4-lauryl-2-ethylphenol, 4-cyclopentylphenol, 2-cyclopentylphenol, 4-cyclohexylphenol, 2-cyclohexylphenol, 2-cyclopentyl-4-chlorophenol, 4-(bicyclo-[2,2,1]-hept-2-yl)-phenol, 2,6-dimethyl-4-cyclohexylphenol, 2-tert.-butyl-4-cyclohexylphenol, 2,4-di-(cyclopentyl)-phenol, 2,4,5-tri-(cyclopentyl)-phenol, 4-chloro-2-cyclohexylphenol, 2-cyclohexyl-4-tert.-butyl-phenol, 4-(bicyclo[2,2,1]hept-2-yl)-2-chloro-phenol, 2,4-di(cyclopentyl)-5-methyl-phenol, 4-phenyl-1-naphthol, 4-cyclohexyl-1-naphthol, 2-benzylphenol, 4-benzylphenol, 4-(α,α-dimethylbenzyl)-phenol, 4-benzyl-3,5-dimethyl-phenol, 4-tert.-butyl-2-benzylphenol, 4-benzyl-1-naphthol, 4-(4-chlorobenzyl)-phenol, 4-(4'-methylbenzyl)-2-ethyl-phenol, 4-(3',4'-dichlorobenzyl)-phenol, 4-hydroxystilbene, 3-hydroxy-dibenzyl, 2-benzyl-4-chlorophenol, 2-isopropyl-4-methylmercapto-phenol, 2-methyl-4-n-butylmercapto-phenol, 2-cyclopentyl-4-ethylmercapto-phenoyl, 2-benzyl-4-isopropylmercapto-phenol, 4-phenylmercapto-phenol, 3,4'-dimethyl-4-hydroxy-diphenyl-thioether, 2-bromo-4-benzylmercapto-phenol, 2-ethyl-4-cyclohexylmercapto-phenol, 3,5-dimethyl-4-methylmercapto-phenol, 3,5-dimethyl-4-propylmercapto-phenol, 3',4'-dichloro-4-hydroxy-diphenyl-thioether, 2',4'-dichloro-5'-methyl-4-hydroxy-diphenyl-thioether, 2',4'-dichloro-4-hydroxy-diphenyl-thioether, 3-tert.-butyl-4'-chloro-4-hydroxy-diphenyl-thioether, 4-(α-naphthylmercapto)-phenol, 3-methyl-4-(β-naphthylmercapto)-phenol, 3-ethyl-2',4',5'-trichloro-4-hydroxy-diphenyl-thioether, 4-(5,6,7,8-tetrahydronaphth-2-ylmercapto)-phenol, 4-(α-naphthylmethyl-mercapto)-phenol, 2',3',4',5',6'-pentachloro-4-hydroxydiphenyl-thioether, 2-phenyl-4'-tert.-butyl-4-hydroxydiphenyl-thioether, 2-phenoxy-4-ethylmercapto-phenol, 4-hydroxy-4'-benzyl-diphenyl-thioether, 4-hydroxy-4'-phenoxydiphenyl-thioether, 4-hydroxy-4'-phenyl-diphenyl-thioether, 4-hydroxy-4'-cyclohexyl-diphenyl-thioether, 4-(benzthiazol-2-ylmercapto)-phenol, 4-(6-methylbenzthiazol-2-yl-mercapto)phenol, 4-(6-cyclohexylbenzthiazol-2-yl-mercapto)-phenol, 4-(6-ethoxybenzthiazol-2-yl-mercapto)-phenol, 4-(benzoxazol-2-yl-mercapto)-phenol, 4-(naphth[1,2-d]thiazol-2-yl-mercapto)phenol, 2,4,5,6-tetrachloro-m-cresol, pentachlorophenol, the isomeric methoxy-phenols, ethoxy-phenols, methylmercaptophenols, ethylmercapto-phenols, 4-cyano-phenol, 4-carboethoxy-phenol, 4-carbobutoxy-phenol and 4-benzyloxycarbonylphenol.

The dyestuffs according to the invention are outstandingly suitable for dyeing and printing hydrophobic fibre materials, especially polyesters, for example those from terephthalic acid and ethylene glycol or 1,4-bis-(hydroxymethyl)-cyclohexane, polycarbonates, for example those from α,α-dimethyl-4,4'-dihydroxydiphenylmethane and phosgene, cellulose esters, for example cellulose triacetate, and fibres based on polyvinyl chloride.

The dyestuffs are used in accordance with the known dyeing process, for example in the exhaustion process as aqueous dispersions in the presence of customary dispersing agents and, optionally, of customary swelling agents (carriers) at temperatures near 100° C. or without carriers at 120° - 140° C (HT process).

The are furthermore outstandingly suitable for dyeing in accordance with the known thermosol process. They dye wool and cotton, present at the same time in the dye bath, only slightly or not at all, so that they can be used readily for dyeing polyester/wool and polyester/cellulose fibre mixed fabrics. They possess excellent solubility in numerous organic solvents and can be used for dyeing lacquers and oils, bulk-dyeing plastics, such as styrene and polyethylene, and dyeing fibres in accordance with the customary spin-dyeing processes or from non-aqueous dyeing liquors.

The dyestuffs according to the invention impart clear yellow dyeings of very good fastness to light and good fastness to washing and sublimation to the hydrophobic materials mentioned.

They can be used for combination dyeing with blue azo and anthraquinone disperse dyestuffs and in that case give green dyeings of good fastness to light, which do not show any "catalytic fading" on cellulose triacetate and on polyester.

The good dye bath stability and stability to boiling of the dyestuffs according to the invention in neutral to moderately basic liquors or printing pastes (pH stability up to about pH 10) should be singled out particularly; as a result, the dyestuffs are also very suitable for one-bath dyeing (thermosol-thermofixing process) and printing of polyester/cotton mixed fabrics in combination with reactive dyestuffs which require the presence of alkali (sodium carbonate or sodium bicarbonate).

In the examples which follow, parts denote parts by weight, unless expressly stated otherwise; they bear the same ratio to parts by volume (parts by vol.) as the gram to the milliliter. The temperatures mentioned are to be understood as degrees centigrade.

EXAMPLE 1

41.9 parts of the aldehyde of the formula

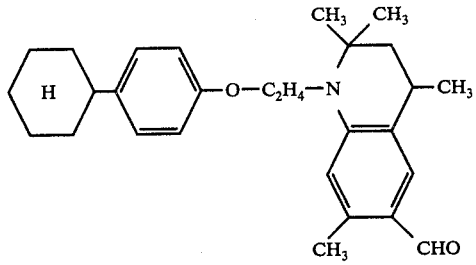

and 7 parts of malodinitrile in 400 parts by volume of methanol, with 0.5 part of piperidine added, are stirred for 3 hours at 70° C. Hereupon the dyestuff of the formula

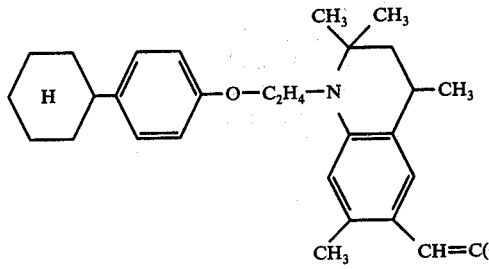

forms. It is separated from the reaction mixture by filtration and forms a yellow, crystalline powder which can be purified by recrystallisation from ethanol, with addition of fuller's earth. Thereafter, the dyestuff melts at 136° - 137° C. Its yield is 40 - 42 parts; it dyes polyester fibres and cellulose triacetate rayon in brilliant greenish-tinged yellow shades of good fastness to light, wet processing and sublimation, and shows excellent stability to boiling in a dye bath above pH 5, and even at pH 9-10.

If instead of malodinitrile equivalent amounts of cyanoacetic acid methyl ester, cyanoacetic acid ethyl ester, cyanoacetic acid propyl ester cyanoacetic acid n-butyl ester, cyanoacetic acid benzyl ester, cyanoacetic acid cyclohexyl ester, cyanoacetic acid 4-chlorobenzyl ester, cyanoacetic acid phenylethyl ester, cyanoacetic acid γ-phenylpropyl ester or cyanoacetic acid β-(p-tolyl)-ethyl ester are reacted wih the aldehyde of the present example, valuable styryl dyestuffs are again obtained, in which one of the cyano groups in the above formula is replaced by the particular carboxylic acid ester group. To avoid transesterifications in the course of the preparation or recrystallisation of the dyestuffs, the processes are suitably carried out in the corresponding alcohols or in inert solvents (toluene, dioxane or acetonitrile) which, if necessary, are also distilled off again before recrystallisation, after which the product is recrystallised from non-polar solvents (toluene/cyclohexane or methylcyclohexane).

The dyestuffs thus prepared exhibit similar tinctorial properties to the corresponding malodinitrile dyestuff, though the shades are throughout somewhat more greenish-tinged. Some examples are listed in Table 1, which also indicates the colour shade on polyester fibres and cellulose triacetate fibres.

Table 1
Styryl dyestuffs of the formula

| Example No. | Z | Colour shade on polyester |
|---|---|---|
| 2 | COOCH₃ | greenish-tinged yellow |
| 3 | COOC₂H₅ | " |
| 4 | COOC₃H₇ | " |
| 5 | COOC₄H₉(n) | " |
| 6 | COOCH₂—C₆H₅ | " |

Table 1-continued

Styryl dyestuffs of the formula

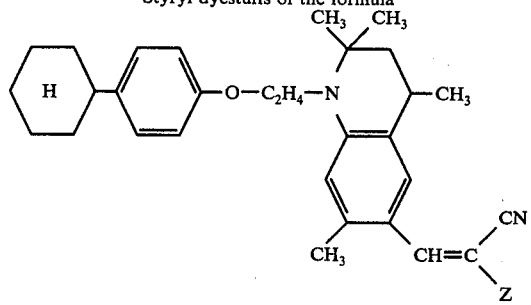

| Example No. | Z | Colour shade on polyester |
|---|---|---|
| 7 | 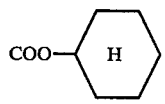 | " |
| 8 | 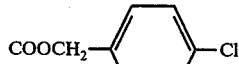 | " |
| 9 | COOC$_2$H$_4$—C$_6$H$_5$ | " |
| 10 | COO(CH$_2$)$_3$—C$_6$H$_5$ | " |
| 11 | 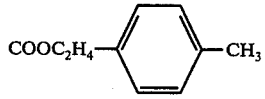 | " |

The aldehyde employed to prepare the dyestuffs of Examples 1 to 11 is obtained as follows:

(a) 12.7 parts of sodium are dissolved in 800 parts by volume of ethanol, 97 parts of 4-cyclohexylphenol and 120 parts of N-β-chloroethyl-2,2,4,7-tetramethyl-1,2,3,4-tetrahydroquinoline (prepared from the N-β-hydroxyethyl compound in the usual manner by reaction with phosphorus oxychloride at 80° – 90° C; compare U.S. Pat. Nos. 3,247,211 and 3,453,280) are added. After heating the mixture for 6 hours to the reflux temperature, the β-chloroethyl compound has been converted almost completely (thin layer chromatography). The mixture is allowed to cool, the NaCl which was separated off is removed by filtration and washed with alcohol, and the filtrate is evaporated. The oily residue is taken up in chloroform and the solution is extracted by shaking with dilute sodium hydroxide solution, in order to remove excess 4-cyclohexylphenol. After washing until neutral, the chloroform solution is completely freed from the solvent by distillation. 177 parts of base of the formula

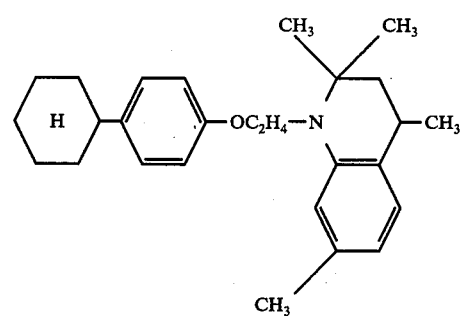

are left in the form of a brownish oil which is characterised by its mass spectrum (molecular weight calculated and found at m/e = 391) and is employed, without special purification for the synthesis of the dyestuff.

(b) 176.5 parts of the crude base according to a) are dissolved in 110 parts of dimethylformamide, 92 parts of phosphorus oxychloride are added dropwise at 40° – 50° C whilst cooling and the mixture is then stirred for 15 hours at 50° – 60° C. The product of the Vilsmeier formylation is then isolated in the usual manner by pouring out onto ice, rendering alkaline with concentrated sodium hydroxide solution, extracting with chloroform, washing the chloroform solution until neutral, and distilling off the solvent. About 160 of crude aldehyde are obtained in the form of a brownish oil which can be used, without further purification, for the preparation of the dystuff. The calculated molecular weight of the aldehyde is confirmed by mass spectroscopy (m/e = 419).

A great variety of other N-aryloxyalkyl-tetrahydroquinolin-6-aldehydes can be prepared as above, starting from the N-hydroxyalkyl-tetrahydroquinolines which in most cases are known from the literature or are prepared in accordance with methods known from the literature, and can be converted to valuable styryl dyestuffs in accordance with the invention. Table 2 which follows lists, by way of explanation, such examples and the shade of their dyeings on polyester fibres and cellulose triacetate fibres.

Table 2

Styryl dyestuffs of the formula III

| Example | A | B' | V$_{1,2,3,4}$ | Y' | Z | Colour shade |
|---|---|---|---|---|---|---|
| 12 | 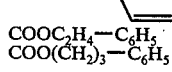 (cyclohexyl-phenyl with H) | C$_2$H$_4$ | 2,2,4-Trimethyl | H | CN | greenish-tinged yellow |
| 13 | (cyclohexyl-phenyl with H) | C$_2$H$_4$ | 2-Methyl | CH$_3$ | CN | " |
| 14 | (cyclohexyl-phenyl with H) | —CH—CH$_2$—<br>    \|<br>   CH$_3$ | 2-Methyl | CH$_3$ | CN | " |

Table 2-continued
Styryl dyestuffs of the formula III

| Example | A | B' | $V_{1,2,3,4}$ | Y' | Z | Colour shade |
|---|---|---|---|---|---|---|
| 15 | cyclohexyl-phenyl- (H on cyclohexyl) | $C_2H_4$ | 2,2,4-Trimethyl | $OCH_3$ | CN | " |
| 16 | cyclohexyl-phenyl- (H on cyclohexyl) | $C_2H_4$ | 2,2,4-Trimethyl | Cl | CN | " |
| 17 | phenyl- | $-CH-CH_2$ with $C_6H_5$ | 2-Methyl | H | CN | " |
| 18 | $CH_3$-phenyl- (p-tolyl) | $-CH-CH_2-$ with $CH_2-OCH_3$ | 2,2,4-Trimethyl | $CH_3$ | CN | " |
| 19 | 2,3-dimethylphenyl- ($CH_3$, $CH_3$) | $-C_2H_4-$ | 2,2,4-Trimethyl | H | CN | " |
| 20 | Br-phenyl- (p-bromophenyl) | $-C_2H_4-$ | 2,2,4-Trimethyl | $CH_3$ | $COOCH_2C_6H_5$ | " |
| 21 | 2,4,5-trichlorophenyl- (Cl, Cl, Cl) | $-C_2H_4-$ | 2,2,4-Trimethyl | $CH_3$ | CN | " |
| 22 | $Cl_5$-phenyl- (pentachlorophenyl)* | $-C_2H_4-$ | 2,2,4-Trimethyl | $CH_3$ | CN | " |
| 23 | $C_6H_5$-phenyl- (m-biphenylyl) | $-C_2H_4-$ | 2,2,4-Trimethyl | H | CN | " |
| 24 | $C_6H_5$-phenyl- (p-biphenylyl) | $-C_2H_4-$ | 2,2,4-Trimethyl | $CH_3$ | CN | " |
| 25 | $C_6H_5-C_2H_4$-phenyl- | $-C_2H_4-$ | 2-Methyl | $CH_3$ | CN | " |
| 26 | $C_6H_5-O$-phenyl- | $-C_2H_4-$ | 2,2,4-Trimethyl | $CH_3$ | CN | " |

Table 2-continued
Styryl dyestuffs of the formula III

| Example | A | B' | $V_{1,2,3,4}$ | Y' | Z | Colour shade |
|---|---|---|---|---|---|---|
| 27 | 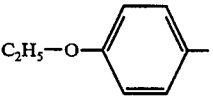 C$_2$H$_5$—O— | —C$_2$H$_4$— | 2,2,4-Trimethyl-3-chlor | H | CN | " |
| 28 | 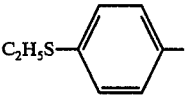 C$_2$H$_5$S— | —C$_2$H$_4$— | 2-Methyl | CH$_3$ | CN | " |
| 29 | 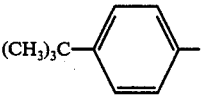 (CH$_3$)$_3$C— | —CH—CH$_2$—<br>    |<br>   CH$_3$ | 2-Methyl | CH$_3$ | CN | " |
| 30 | 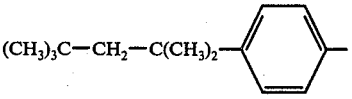 (CH$_3$)$_3$C—CH$_2$—C(CH$_3$)$_2$— | —CH$_2$—CH$_2$— | 2-Methyl | H | CN | " |
| 31 | 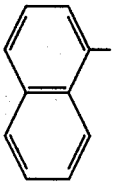 | —CH$_2$—CH$_2$— | 2,2,4-Trimethyl | CH$_3$ | CN | " |
| 32 |  | —CH$_2$—CH$_2$— | 2,2,4-Trimethyl | CH$_3$ | CN | " |
| 33 | 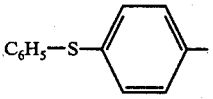 C$_6$H$_5$—S— | —CH$_2$—CH$_2$— | 2,2,4-Trimethyl | H | CN | " |
| 34 | 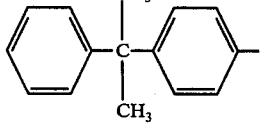 | —CH$_2$—CH$_2$— | 2-Methyl | CH$_3$ | CN | " |
| 35 | 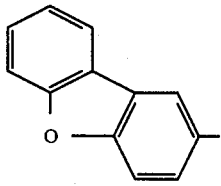 | —CH$_2$—CH$_2$— | 2-Methyl | CH$_3$ | CN | " |
| 36 | 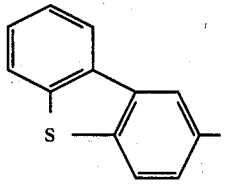 | —CH$_2$—CH$_2$— | 2-Methyl | CH$_3$ | CN | " |
| 37 | 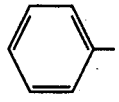 | —CH$_2$—CH$_2$— | 2-Methyl | CH$_3$ | CN | " |

Table 2-continued

Styryl dyestuffs of the formula III

| Example | A | B' | $V_{1,2,3,4}$ | Y' | Z | Colour shade |
|---|---|---|---|---|---|---|
| 38 | 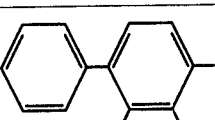 | —CH₂—CH₂— | 2-Methyl | CH₃ | CN | " |
| 39 | 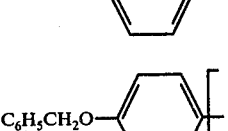 | —C₂H₄— | 2-Methyl | CH₃ | CN | " |

\* This symbol represents pentachlorophenyl

EXAMPLE 40

42.3 parts of the aldehyde of the formula

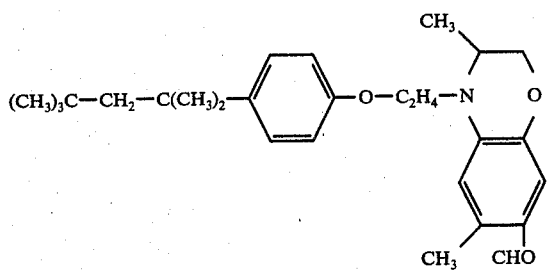

are reacted, analogously to Example 1, with 7 parts of malodinitrile, in the presence of 0.5 part of piperidine in 400 parts by volume of methanol, by boiling for about 2 hours under reflux. After cooling, about 42 – 43 parts of the dyestuff of the formula

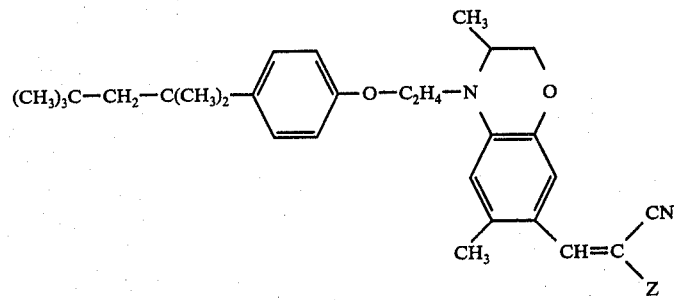

wherein Z = CN
are isolated in the usual manner. The molecular weight determined by mass spectrometry, m/e = 471, corresponds to that calculated for this dyestuff. The dyestuff dyes polyester materials and celluose triacetate fibres in clear, somewhat greenish-tinged yellow shades. These dyeings are distinguished by very good fastness to light, wet processing and sublimation and very good general fastness properties. The dyebath stability of the dyestuff in the neutral to moderately basic pH range, and even at a pH as high as 9 – 10, is outstanding.

Condensation of the same aldehyde with cyanoacetic acid esters Z—CH₂—CN, in place of malodinitrile, whilst observing the special conditions mentioned in respect thereof under Example 1, also gives valuable boil-resistant styryl dyestuffs which dye polyester fibres and cellulose triacetate fibres to give dyeings with comparable fastness properties, but which are slightly more greenish-tinged yellow. Table 3 shows a selection of these dyestuffs and indicates the colour shade on polyester fibres.

Table 3

| Example | Z | Colour shade on polyester fibres |
|---|---|---|
| 41 | COOCH₃ | greenish-tinged yellow |
| 42 | COOC₂H₅ | " |
| 43 | COOC₃H₇(i) | " |
| 44 | COOC₄H₉(n) | " |
| 45 | COOC₂H₄OC₂H₅ | " |
| 46 | COOC₂H₄CN | " |
| 47 | COOC₂H₄C₆H₅ | " |

The aldehyde used in Examples 40 – 47 is obtained as an oil, starting from N-(β-hydroxyethyl)-3,6-dimethyl-benzomorpholine (compare U.S. Pat. No. 3,453,270), analogously to the procedure indicated under Example 1 (a) and (b), and is employed, without special purification, for the synthesis of the dyestuff. The same aldehyde is obtained, again in high yield, by reacting N-(β-chloroethyl)-3,6-dimethyl-benzomorpholin-7-aldehyde for about 8 hours with at least an equimolar amount of sodium 4-isooctylphenolate in chlorobenzene at 140° – 150° C, filtering off the salt which has separated out after the mixture has cooled, and completely removing the solvent by vacuum distillation.

The dyestuff of Example 40 is also obtained in the following manner, starting from 4-(β-chloroethyl)-3,6-dimethyl-7-(β,β-dicyanovinyl)-benzomorpholine (compare U.S. Pat. No. 3,453,270): 23 parts of dry sodium 4-isooctylphenolate and 30 parts of 4-(β-chloroethyl)-3,6-dimethyl-7-(β,β-dicyanovinyl)-benzomorpholine in 200 parts by volume of dry chlorobenzene (or N-methylpyrrolidone) are stirred for about 4 – 6 hours at 130° – 140° C until the β-chloroethyl dyestuff has, according to a chromatogram, been converted practically completely. After cooling, the solution is washed, dried over sodium sulphate and clarified with fuller's earth, and the solvent is removed by vacuum distillation. The initially oily residue turns crystalline on treatment with ethanol. The product is filtered off and washed with ethanol and then with water, and dried to give about 34 parts of dyestuff of the expected structure.

By choosing appropriately substituted benzmorpholines and oxalkylating agents it is easy to obtain, analogously to U.S. Pat. No. 3,453,270, a large number of N-hydroxyalkyl-benzomorpholines for use as starting compounds for the synthesis of further valuable styryl dyestuffs according to Examples 40 – 47. Such examples of dyestuffs are listed, by way of illustration, in Table 4 which follows. They also give brilliant greenish-tinged yellow dyeings of good fastness to light, wet processing and sublimation and good general fastness properties on polyester fibres and cellulose triacetate fibres and at the same time have excellent stability to boiling in neutral to moderately basic dye baths (up to pH 9 – 10).

Table 4

Dyestuffs of the formula IV

| Example | A | B' | $W_{1,2,3,4}$ | Y' | Z | Colour shade on polyester fibres |
|---|---|---|---|---|---|---|
| 48 | H-phenyl-phenyl- | $-C_2H_4-$ | 3-Methyl | $CH_3$ | CN | greenish-tinged yellow |
| 49 | phenyl- | $-C_2H_4-$ | 2,2,3-Trimethyl | $CH_3$ | CN | " |
| 50 | Cl-phenyl- | $-CH-CH_2-$ \| $CH_3$ | 3-Methyl | $CH_3$ | CN | " |
| 51 | $(CH_3)_3C$-phenyl- | $-C_2H_4-$ | 3-Methyl | $OCH_3$ | CN | " |
| 52 | $Cl_5$-phenyl- | $-C_2H_4-$ | 3-Methyl | H | CN | " |
| 53 | $CH_3$-phenyl- | $-C_2H_4-$ | 3-Methyl | Cl | CN | " |
| 54 | $C_2H_5O$-phenyl- | $-C_2H_4-$ | 3-Methyl | $C_2H_5$ | CN | " |
| 55 | $C_6H_5$-phenyl- | $-C_2H_4-$ | 3-Methyl | $CH_3$ | CN | " |
| 56 | $C_6H_5CH_2$-phenyl- | $-C_2H_4-$ | 3-Methyl | H | CN | " |
| 57 | $C_2H_5S$-phenyl- | $-C_2H_4-$ | 2,2,3-Trimethyl | H | CN | " |
| 58 | H-cyclohexyl-phenyl- | $-C_2H_4-$ | 3-Methyl | H | CN | " |
| 59 | norbornyl-phenyl- | $-C_2H_4-$ | 3-Methyl | H | CN | " |
| 60 | naphthyl- | $-C_2H_4-$ | 3-Methyl | $CH_3$ | CN | " |
| 61 | dibenzofuranyl- | $-C_2H_4-$ | 3-Methyl | $CH_3$ | CN | " |
| 62 | phenyl- | $-CH-CH_2-$ \| $C_6H_5$ | 3-Methyl | H | CN | " |
| 63 | phenyl- | $-CH-CH_2-$ \| $CH_2-O-C_2H_5$ | 3-Methyl | $CH_3$ | CN | " |
| 64 | phenyl- | $-CH-CH_2-$ \| $CH_3$ | 2,2,3-Trimethyl | $CH_3$ | CN | " |
| 65 | phenyl- | $-C_2H_4$ | 3-Methyl | $CH_3$ | $COOC_2H_5$ | " |
| 66 | $C_2H_5$-phenyl- | $-C_2H_4-$ | 3-Athyl | H | CN | " |
| 67 | phenyl- | $-C_2H_4-$ | 3-$C_6H_5$ | $CH_3$ | CN | " |

Table 4-continued

| | Dyestuffs of the formula IV | | | | | |
|---|---|---|---|---|---|---|
| Example | A | B' | $W_{1,2,3,4}$ | Y' | Z | Colour shade on polyester fibres |
| 68 | (phenylnaphthyl) | $-C_2H_4-$ | 3-Methyl | $CH_3$ | CN | " |

EXAMPLE 69

50 parts of the aldehyde of the formula

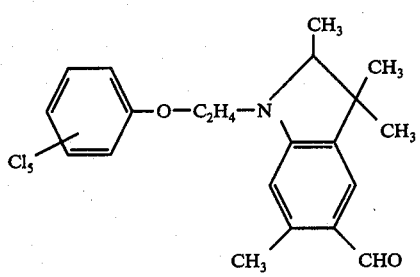

and 7 parts of malodinitrile are condensed in 400 parts by volume of ethanol, in the presence of 0.5 part of piperidine, by heating for 4 hours to the reflux temperature, analogously to Example 1, to give the dyestuff. 44.5 parts of product of the formula

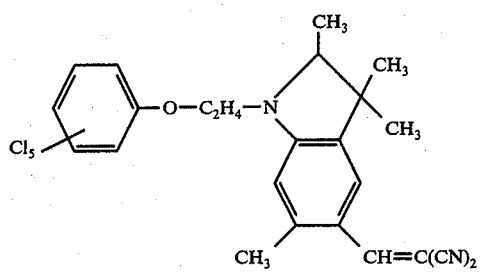

are isolated in the usual manner, as a yellow crystalline powder which can be purified by recrystallisation from butanol in the presence of fuller's earth and then melts at 183° – 185° C. The dyestuff dyes polyester fibres and cellulose acetate fibres in a greenish-tinged yellow shade and has excellent dye bath stability in the neutral to moderately basic pH range, and even at pH 9–10. The dyeings show good fastness to light, wet processing and sublimation, and good general fastness properties.

If the aldehyde of this example is reacted analogously with cyanoacetic acid esters, $Z-CH_2-CN$, instead of with malodinitrile, further valuable styryl dyestuffs having similar tinctorial properties are obtained. Some such examples are contained in Table 5 below, which also states the colour shade on polyester fibres.

Table 5

| Example | Z | Colour shade on polyester fibres |
|---|---|---|
| 70 | $COOCH_3$ | very greenish-tinged yellow |
| 71 | $COOC_2H_5$ | " |
| 72 | $COOCH_2C_6H_5$ | " |
| 73 | $COOC_2H_4CN$ | " |
| 74 | $COOC_2H_6OCH_3$ | " |
| 75 | $COOC_2H_4OC_6H_5$ | " |

To prepare the aldehyde for Examples 69 – 75, sodium pentachlorophenolate is reacted with N-β-chloroethyl-2,3,3,6-tetramethyl-indoline in ethanol solution, analogously to Example 1 (a), by boiling for 8 hours under reflux, to give the N-β-(pentachlorophenoxy)-ethyl base, which is formylated in the 5-position by the Vilsmeier method, analogously to Example 1 (b). The base and the aldehyde are obtained in the form of oils and are used without further purification.

Other N-aryloxyalkyl-indolin-5-aldehydes are easily accessible analogously and are also converted, according to the invention, to valuable styryl dyestuffs, which exhibit comparably outstanding dye bath stabilities and comparably good tinctorial properties when dyeing polyester fibres and cellulose triacetate fibres, to those shown by the preceding examples 69 – 75. Some dyestuffs of this type are listed in Table 6 which follows.

Table 6

| | Styryl dyestuffs of the formula II | | | | | |
|---|---|---|---|---|---|---|
| Example | A | B' | $U_{1,2,3,4}$ | Y' | Z | Colour shade on polyester fibres |
| 76 | Cl₅-phenyl | $-C_2H_4-$ | 2,3,3-Tri-methyl | H | CN | greenish-tinged yellow |
| 77 | Cl,Cl-phenyl | $-CH-CH_2-$ | 2,3,3-Tri-methyl | $CH_3$ | CN | " |
| 78 | Cl-phenyl | $-CH-CH_2-$<br>\|<br>$CH_2-OCH_3$ | 2,3,3-Tri-methyl | $CH_3$ | CN | " |
| 79 | H-phenyl-phenyl | $-C_2H_4-$ | 2-Methyl | H | CN | " |
| 80 | H-phenyl-phenyl | $-C_2H_4-$ | 2,3,3-Tri-methyl | $CH_3$ | CN | " |
| 81 | $(CH_3)_3C$-phenyl | $-C_2H_4-$ | 2,3,3-Tri-methyl | $CH_3$ | CN | " |

Table 6-continued

| | Styryl dyestuffs of the formula II | | | | | |
|---|---|---|---|---|---|---|
| Example | A | B' | $U_{1,2,3,4}$ | Y' | Z | Colour shade on polyester fibres |
| 82 | 3,5-dimethylphenyl | —C$_2$H$_4$— | 2,3,3-Trimethyl | CH$_3$ | CN | " |
| 83 | phenyl | —CH—CH$_2$—<br>       \|<br>      C$_6$H$_5$ | 2,3,3-Trimethyl | CH$_3$ | CN | " |
| 84 | C$_6$H$_5$—C$_6$H$_4$— (4-biphenyl) | —C$_2$H$_4$— | 2,3,3-Trimethyl | H | CN | " |
| 85 | C$_6$H$_5$—C$_6$H$_4$— (3-biphenyl) | —C$_2$H$_4$— | 2,3,3-Trimethyl | CH$_3$ | CN | " |
| 86 | C$_6$H$_5$—O—C$_6$H$_4$— | —C$_2$H$_4$— | 2,3,3-Trimethyl | CH$_3$ | CN | " |
| 87 | dibenzofuranyl | —C$_2$H$_4$— | 2,3,3-Trimethyl | C$_2$H$_5$ | CN | " |
| 88 | naphthyl | —C$_2$H$_4$— | 2,3,3-Trimethyl | CH$_3$O | CN | " |
| 89 | (CH$_3$)$_2$C(C$_6$H$_5$)(C$_6$H$_4$—) | —C$_2$H$_4$— | 2,3,3-Trimethyl | CH$_3$ | CN | " |
| 90 | C$_6$H$_5$—CH$_2$—C$_6$H$_4$— | —C$_2$H$_4$— | 2,3,3-Trimethyl | CH$_3$ | CN | " |
| 91 | Cl—C$_6$H$_4$—CH$_2$—C$_6$H$_4$— | —C$_2$H$_4$— | 2,3,3-Trimethyl | CH$_3$ | CN | " |

EXAMPLE 92

7 parts of malodinitrile and 55 parts of the azomethine of the formula

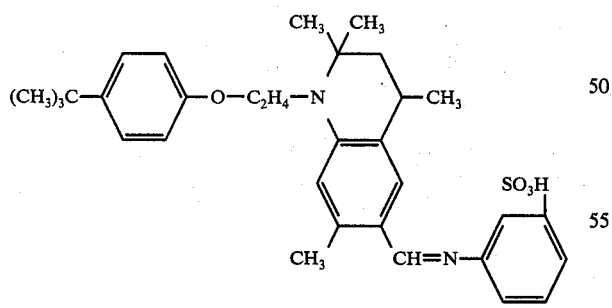

prepared analogously to Example 17 of U.S. Pat. No. 2,583,551 from N-β-(4-tert.-butylphenoxy)-ethyl-2,2,4,7-tetramethyl-1,2,3,4-tetrahydroquinoline, are heated to the boil for about 3 hours in 800 parts by volume of methanol in the presence of 3 parts of piperidine. The dyestuff which has separated out is isolated and purified in the usual manner and about 32.5 parts of the dyestuff of the formula

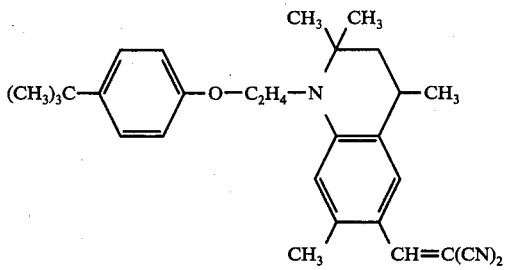

are obtained. This can be purified further by recrystallisation from ethanol (melting point 124° – 125° C). It has a high stability to boiling in the dye bath and dyes polyester fibres in brilliant greenish-tinged yellow shades with good fastness to light, wet processing and sublimation.

The same dyestuff is obtained by starting from other azomethines, for example from those which in place of metanilic acid are derived from sulphanilic acid, anthranilic acid or aniline and can be prepared, and converted to the styryl dyestuff, in an analogous manner.

EXAMPLE 93

33 parts of the dyestuff of the formula

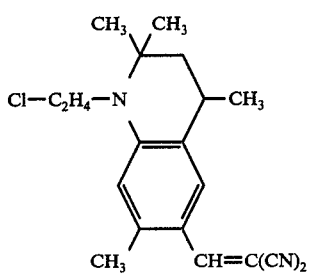

prepared from N-β-hydroxyethyl-2,2,4,7-tetramethyl-1,2,3,4-tetrahydroquinoline by customary reaction with phosphorus oxychloride/dimethylformamide under the conditions of the Vilsmeier reaction and subsequent condensation of the N-β-chloroethyl-6-formyl compound with malodinitrile in a one-pot process, according to German Offenlegungsschrift (German Published Specification) No. 2,308,706, are heated with 20 parts of dry sodium 2,4-dichlorophenolate in 100 parts of N-methylpyrrolidone to 135° – 145° C until the N-β-chloroethyl compound has been converted practically completely (about 4 – 6 hours). The dyestuff is caused to separate out from the solution which has cooled, by adding about 600 – 800 parts by volume of ethanol, and is isolated in the usual manner, washed with ethanol and with water and dried. It is purified by recrystallisation from ethanol with addition of fuller's earth. 32 parts of the dyestuff of the formula

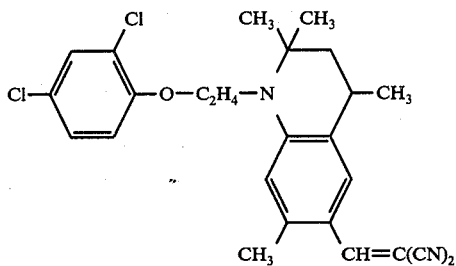

are obtained; this dyestuff gives greenish-tinged yellow dyeings of good fastness to light; wet processing and sublimation on polyester fibres. Its stability to boiling in the dye bath is outstanding even at a pH as high as 7 – 9.

The same dyestuff is obtained if the water is removed azeotropically from a mixture of 18 parts of 2,4-dichlorophenol and 12 parts of 50% strength potassium hydroxide solution and 400 parts by volume of chlorobenzene, 33 parts of the above β-chloroethyl dyestuff are then added and thereafter the procedure described above is followed.

EXAMPLE 94

0.5 part of potassium carbonate is added to 25.2 parts of N-β-chloroethyl-2,7-dimethyl-1,2,3,4-tetrahydroquinoline-6-aldehyde and 28 parts of dry sodium pentachlorophenolate in 60 parts by volume of dimethylformamide and the mixture is stirred for 5 hours at 140° – 150° C, whereby the β-chloroethyl-aldehyde is converted practically completely to the β-pentachlorophenoxyethyl-aldehyde. The mixture is now allowed to cool to 50° – 60° C, 7 parts of malodinitrile are added and the whole is kept at this temperature for 1 hour. The separating-out of the styryl dyestuff is completed by adding about 100 parts by volume of ethanol and continuing to stir at 5° – 10° C. The dyestuff is filtered off, washed with ethanol and then with water, and dried. 41 parts of dyestuff of the formula

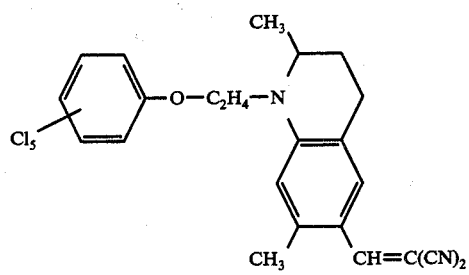

are obtained. The dyestuff dyes cellulose triacetate fibres and polyester fibres in greenish-tinged yellow shades of good fastness to light, wet processing and sublimation and is distinguished by very good stability in the dye bath in the neutral to weakly basic pH range.

It can be seen that using the procedures described in Examples 93 and 94, a multiplicity of further new dyestuffs according to the invention can be synthesised by varying the phenol or phenolate component and the N-chloroethyl component, in particular also on replacing the latter by chloropropyl or bromopropyl compounds and chlorobutyl or bromobutyl compounds. Examples of such dyestuffs are to be found in Table 7.

EXAMPLE 95

15 parts of finely powdered anhydrous potassium carbonate are added to 30 parts of 4-(β-bromoethoxy)-cyclohexylbenzene and 19 parts of 2,2,4,7-tetramethyl-1,2,3,4-tetrahydroquinoline in 300 parts by volume of toluene and the mixture is heated to the reflux temperature for about 8 – 10 hours. As soon as practically complete conversion of the tetramethyl-tetrahydroquinoline is recognisable from a thin layer chromatogram, the reaction mixture is allowed to run into dilute sodium hydroxide solution. After washing and drying the toluene solution and removing the solvent by distillation, a dark oil (35 parts) is obtained. This is formylated, without additional purification, by the Vilsmeier method in the manner described under Example 1(b), the crude aldehyde is condensed with malodinitrile and the styryl dyestuff is isolated as described in Example 1. According to the melting point and mixed melting point, the recrystallised dyestuff is identical with the dyestuff of Example 1.

The 4-(β-bromoethoxy)-cyclohexylbenzene used above could be obtained in a manner which is in itself known by reaction of 1,2-dibromoethane with 4-cyclohexylphenol in aqueous sodium hydroxide solution (compare German Auslegeschrift (German Published Specification) No. 1,443,216). If instead of 4-(β-bromoethoxy)-cyclohexylbenzene, 4-(γ-bromopropoxy)-cyclohexylbenzene, which is easily accessible from 1,3-dibromopropane and 4-cyclohexylphenol, or 4-(δ-chlorobutoxy)-cyclohexylbenzene, which is accessible from 4-chlorobutyl bromide and 4-cyclohexylphenol, is used, homologous dyestuffs are obtained, of which the base part can be varied through the choice of the secondary amine. By employing other phenols, further new dyestuffs according to the invention are obtained, all of which couple very good resistance to boiling in a neutral to weakly basic dye bath with good fastness to light, wet processing and sublimation of the brilliant greenish-tinged yellow dyeings which they give on polyester fibers and cellulose acetate fibres. Table 7 which follows serves further to illustrate Examples 93 – 95 by analogously synthesised examples of dyestuffs, and indicates their colour shade on polyester fibres.

bath at 40° – 50° C, the temperature is raised to 80° – 85° C over the course of 15 – 20 minutes and kept thereat for 20 minutes, and the bath is now gradually brought to the boil. After 1 – 1.5 hours' boiling, the dyeing process has ended. The dyed goods are rinsed once hot and then cold, and are dried. They exhibit a clear greenish-tinged yellow dyeing of very good fastness to light, washing and sublimation.

Table 7

Methine dyestuffs of the formula

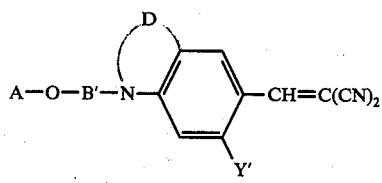

| Example | A | B' | D | Y' | Colour shade on polyester fibres |
|---|---|---|---|---|---|
| 96 | H-⟨⟩-⟨⟩- | —(CH$_2$)$_3$— | —C(CH$_3$)$_2$—CH$_2$—CH(CH$_3$)— | CH$_3$ | greenish-tinged yellow |
| 97 | H-⟨⟩-⟨⟩- | —(CH$_2$)$_4$— | " | H | " |
| 98 | H-⟨⟩-⟨⟩- | —(CH$_2$)$_4$— | " | CH$_3$ | " |
| 99 | CH$_3$-⟨⟩- | —(CH$_2$)$_4$— | " | C$_2$H$_5$ | " |
| 100 | (CH$_3$)$_3$C-⟨⟩- | —(CH$_2$)$_3$— | " | CH$_3$ | " |
| 101 | Cl$_5$-⟨⟩- | —(CH$_2$)$_4$— | —CH(CH$_3$)—(CH$_2$)$_2$— | CH$_3$ | " |
| 102 | CH$_3$,CH$_3$-⟨⟩- | —(CH$_2$)$_4$— | —CH(CH$_3$)—CH$_2$—O— | CH$_3$ | " |
| 103 | C$_6$H$_5$—CH$_2$-⟨⟩- | —(CH$_2$)$_3$— | —C(CH$_3$)$_2$—CH$_2$—CH(CH$_3$)— | H | " |
| 104 | C$_6$H$_5$-⟨⟩- | —(CH$_2$)$_4$— | —CH(CH$_3$)—C(CH$_3$)$_2$—O— | CH$_3$ | " |
| 105 | dibenzofuranyl | —(CH$_2$)$_3$— | —CH(CH$_3$)—C(CH$_3$)$_2$— | H | " |

EXAMPLE 106

1 part of the dyestuff according to Example 1, of the formula

[structure: H-⟨⟩-⟨⟩-O—C$_2$H$_4$—N with substituted ring bearing CH$_3$, CH$_3$, CH$_3$ groups and CH=C(CN)$_2$]

is dissolved in 25 g of dimethylformamide, 1 part of a dispersing agent (alkylaryl polyglycol ether) is added and a fine dispersion is prepared by stirring the mixture into 4,000 parts by volume of water. 20 g of a carrier (cresotic acid ester) and 4 g of monosodium dihydrogen phosphate are also added to the dispersion and the pH value of the dye bath is adjusted to 4.5 – 5 by means of acetic acid. 100 parts of previously cleaned polyester material (polyethylene glycol terephthalate of the Dacron type, of Messrs. Du Pont) are introduced into this The dyestuff can also be used as a conditioned powder, by grinding it, as an aqeuous paste, with a dispersing agent (for example ligninsulphonate) and then drying it.

If the co-use of a carrier is dispensed with, a comparable dyeing is obtained by working with a liquor ratio of 1 : 20 and using the high temperature dyeing process (HT process). Again, the previously cleaned polyester material is introduced, at 40° – 50° C, into the dye bath which in other respects has been prepared in the same way, the bath temperature is raised to 125° C over the course of 30 – 40 minutes and dyeing is carried out for 1 – 1.5 hours at this temperature.

EXAMPLE 107

100 parts of a fabric of cellulose triacetic rayon is dyed for 1 hour at the boil in a dye bath prepared from 1.5 parts of the dyestuff according to Example 32, 4 parts of Marseilles soap and 4,000 parts of water. The resulting greenish-tinged yellow dyeing has very good fastness properties.

EXAMPLE 108

1,000 parts of polystyrene are mixed with 6 parts of the dyestuff according to Example 101 and the mixture is fused in the usual manner under a nitrogen atmosphere at about 200° C. The greenish-tinged yellow injection mouldings obtained from this material exhibit good colour fastness properties.

I claim:

1. Water-insoluble styryl dyestuffs of the formula

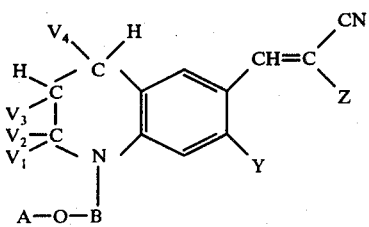

wherein
- $V_1$, $V_2$ and $V_4$, independently of each other, are hydrogen, methyl, ethyl, propyl, or butyl;
- $V_3$ is hydrogen or chlorine;
- A is phenyl, phenyl substituted 1–5 times with chlorine or methyl, or phenyl monosubstituted with bromine cyclohexyl, phenyl, benzyl, α,α-dimethylbenzyl, methoxy, ethoxy, phenoxy, benzyloxy, tertiary-butyl, methylmercapto, phenylmercapto, chlorophenoxy, or methylphenoxy;
- B is $C_2$- to $C_5$-alkylene which is unsubstituted or substituted by $C_1$-$C_4$-alkoxy, $C_3$-$C_5$-alkenyloxy, benzyloxy, phenoxy, phenyl, or mono-, di-, or tri-substituted benzyloxy, phenxoy, or phenyl wherein the substituents are methyl, ethyl, bromo, or chloro;
- Z is cyano or $-CO_2R$;
- R is methyl, ethyl, propyl, n-butyl, benzyl, cyclohexyl, p-chlorobenzyl, phenylethyl, γ-phenylpropyl, β-(p-tolyl)ethyl, isopropyl, ethoxyethyl, cyanoethyl, methoxypropyl, or phenoxyethyl, and
- Y is hydrogen, methyl, methoxy, ethyl, ethoxy, or chloro.

2. The dyestuffs of claim 1 wherein Z is cyano.

3. Water-insoluble styryl dyestuffs according to claim 1, of the formula

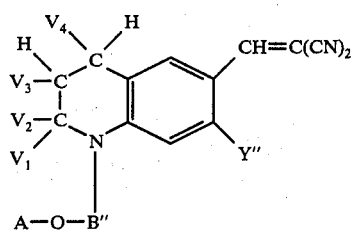

wherein
A, $V_1$, $V_2$, $V_3$ and $V_4$ have the meanings mentioned in claim 1,
B" represents $-CH_2-CH_2-$,

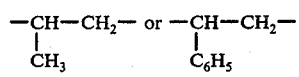

and
Y" represents H or $CH_3$.

4. Water-insoluble styryl dyestuffs according to claim 1, of the formula

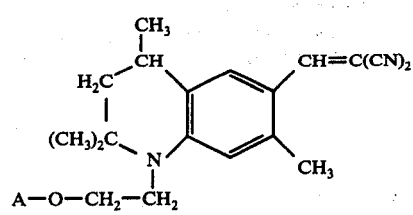

wherein
A has the meaning mentioned in claim 1.

5. Water-insoluble styryl dyestuff according to claim 1, of the formula

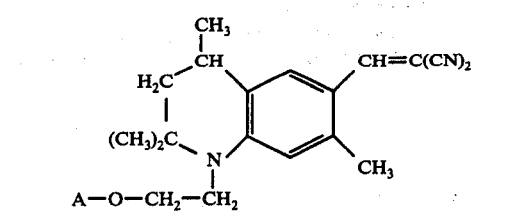

6. Water-insoluble styryl dyestuff according to claim 1, of the formula

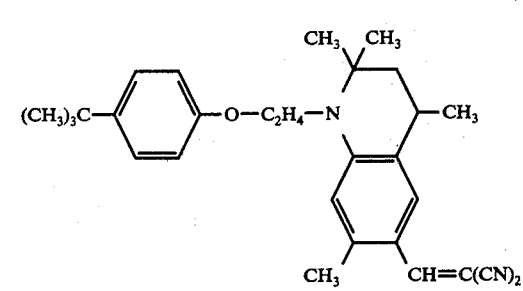

7. Water-insoluble styryl dyestuff according to claim 1, of the formula

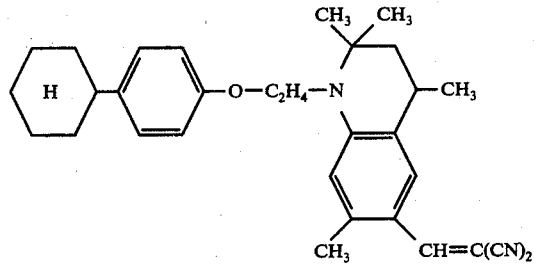

8. Water-insoluble styryl dyestuff according to claim 1, of the formula

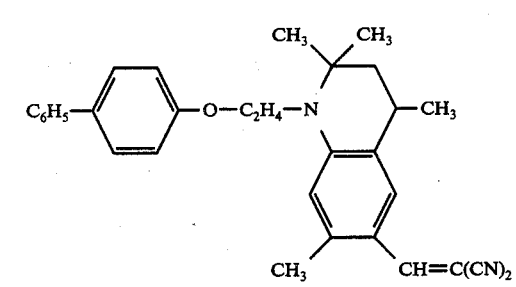

* * * * *